US006991465B2

(12) United States Patent
Matthews

(10) Patent No.: US 6,991,465 B2
(45) Date of Patent: Jan. 31, 2006

(54) EDUCATIONAL SYSTEM

(76) Inventor: Latonia Matthews, 1553 E. 75th St., Los Angeles, CA (US) 90001

( * ) Notice: Subject to any disclaimer, the term of this patent is extended or adjusted under 35 U.S.C. 154(b) by 21 days.

(21) Appl. No.: 10/724,320

(22) Filed: Nov. 26, 2003

(65) Prior Publication Data

US 2004/0197755 A1 Oct. 7, 2004

Related U.S. Application Data

(60) Provisional application No. 60/429,788, filed on Nov. 27, 2002.

(51) Int. Cl.
G09B 19/24 (2006.01)

(52) U.S. Cl. ..................... 434/260
(58) Field of Classification Search ............ 434/260
See application file for complete search history.

(56) References Cited

U.S. PATENT DOCUMENTS

| 3,918,180 A | * | 11/1975 | Chamberlin | 434/178 |
|---|---|---|---|---|
| 4,045,897 A | * | 9/1977 | Gates | 40/620 |
| 4,372,077 A | * | 2/1983 | Balbuena | 446/73 |
| 4,640,512 A | * | 2/1987 | Burke | 273/157 R |
| 5,306,155 A | * | 4/1994 | Koke | 434/410 |
| 5,389,028 A | * | 2/1995 | Cabrera et al. | 446/73 |
| 5,401,032 A | * | 3/1995 | Barnhart et al. | 273/293 |
| 5,733,166 A | * | 3/1998 | Hoag | 446/75 |
| 5,944,574 A | * | 8/1999 | Small et al. | 446/149 |
| 6,023,817 A | * | 2/2000 | Clewans | 24/102 SL |
| 6,506,093 B2 | * | 1/2003 | Avital | 446/83 |
| 6,698,117 B2 | * | 3/2004 | Stefany | 40/124.11 |

OTHER PUBLICATIONS

Brough's Books: Thomas the Tank Engine Books, 1993–2000 <retrieved online Apr. 7, 2004>.*
10 Years of Thomas the Tank Engine & Friends—Best Friends (1999) <retrieved online Apr. 7, 2004>.*

* cited by examiner

Primary Examiner—Kurt Fernstrom
(74) Attorney, Agent, or Firm—Enrica Bruno; Greenburg Traurig, LLP

(57) ABSTRACT

A system of facilitating childhood learning uses a select group of familiar domestic articles which are rendered or portrayed or developed as characters in a story. The devices are fastening devices for use on clothes or different apparel articles, selectively including a zipper, a snap, a button, a buckle and a string or a lace. Features of the human being, for instance at least one of eyes, ears, a nose, a mouth, arms or legs are added to the devices. The story is related in a selected media, which can be a book, television or radio rendition, movie, video or cards.

16 Claims, 1 Drawing Sheet

EDUCATIONAL SYSTEM

RELATED APPLICATION

This invention relates to provisional patent application No 60/429,788 filed Nov. 27, 2002, and the contents thereof are incorporated by reference herein.

BACKGROUND OF THE INVENTION

This invention relates to an educational system. It is particularly directed to a system for facilitating early childhood education.

Many devices, systems and methods are known for promoting education of children. In some situations children have fears and phobias about devices and it is not known how to effectively provide a system and method for simultaneously overcoming such fears and phobias and also promoting education.

This invention is directed to an improvement which seeks to reduce the fears and phobias of children to certain devices, promote self esteem and additionally facilitate childhood education.

SUMMARY OF THE INVENTION

According to the invention there is provided a system of facilitating childhood learning comprising the use of a select group of familiar domestic articles. The group of articles or devices are rendered or portrayed or developed as characters in a story. The story is then related in a selected media.

In a preferred form of the invention the group of devices are fastening devices. More particularly, the devices are fashion devices for use on clothes or different apparel articles.

The group selectively includes a zipper, a snap, a button, a buckle and a string or a lace.

In some forms of the invention multiple characters are developed using multiple zippers, multiple snaps, multiple buttons and multiple buckles and multiple strings or laces.

The media for relating the story can be a book, television or radio rendition, movie, cards, video or other conventional tools and devices used to facilitate learning.

In a preferred form of the invention each of the devices of the group is personalized by adding features of the human being, for instance at least one of eyes, ears, a nose, a mouth, arms or legs.

In yet a further preferred form of the invention, each of the characters of the group are named with a selected name to facilitate character identification and thereby promote learning.

The invented system facilitates childhood learning by using a select group of articles, the articles being selected from an environment which is a normally related theme. The rendering of the group of articles are portrayed as characters in a selected media. The media is selectively at least one of a book, television or radio rendition, movie, video, cards or other conventional tools and devices used to facilitate learning.

The articles can be selected from an environment which is a normally related theme, such as articles devices are household devices. These can be selectively at least one of kitchen appliances, tools, clothing items, fastening devices or apparel articles.

The invention is now further described with reference to the accompanying drawings.

DETAILED DESCRIPTION OF THE INVENTION

Figure 1:
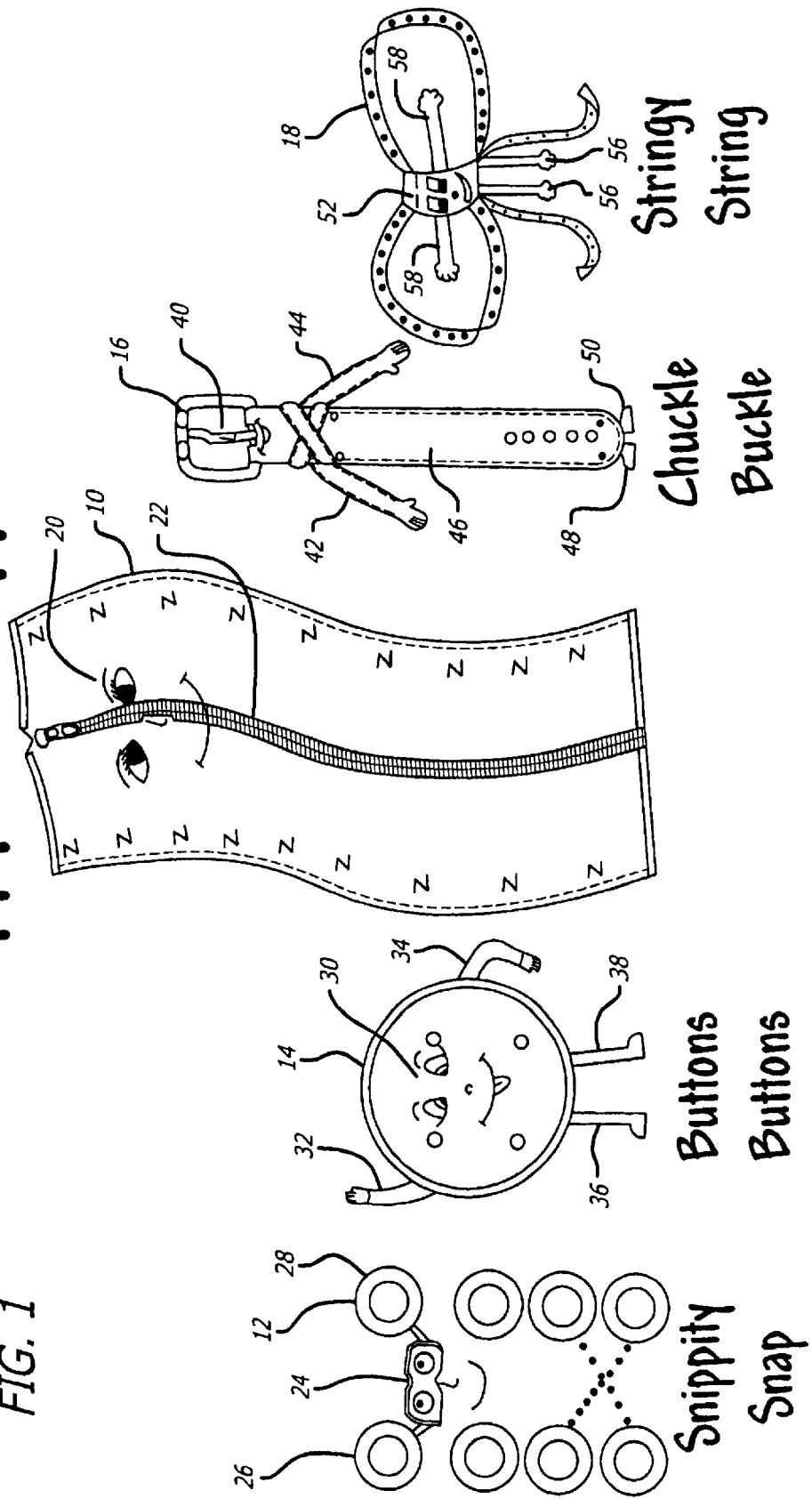
FIG. 1 is a representation showing five devices of a group, the group being fastening devices normally associated with apparel.

A first character of a group is a zipper 10, a second character is a snap 12, a third character is a button 14, a fourth character is a buckle 16, and a fifth character is a string 18.

The zipper 10 is depicted as an elongated two part character and has the representations of a face 20. The face 20 has eyes, nose and ears. A zipping elements 22 are shown down the front of the character. This character is called "Zippy the Zipper".

The second character is a snap, and this snap 12 also is named "Snippity Snap". It has a face 24, which is formed between two rows 26 and 28 of snaps.

The button character 14 has a face 30 and arms 32 and 34, and legs 36 and 38. The button character is called "Buttons Buttons".

The next character is the buckle 16, which has a face 40 represented by the buckle portions, and two arms 42 and 44 extending from the strap portion 46 of the buckle, which would be part of a belt or the like. Two feet 48 and 50 are also shown.

The last member of the group is a string or lace 18 and it has a face 52 which is formed in the center of a bow tie shape for the string. Two feet, 54 and 56 are shown, and arms 58 and 60 are also depicted.

This group of characters, which are fastening devices normally associated with clothing apparel, notions, sewing devices, and the like is particularly a set which children find difficult to manipulate. By creating characters, shapes and forms around these particular devices, the devices have been made to depict a user friendly presentation. This assists in eliminating children's fears and phobias of such devices and promoting self esteem. The characters are formed into a story which is depicted in the book, comic cards, television, video or other format and this facilitates the acquaintance of the children with the characters. This facilitates childhood learning.

While the invention has been described with reference to a group of domestic clothing or apparel fastening items, other similar groups of devices which could be normally difficult for children could be considered as an effective group to tell the story and facilitate the rendition of the story in a suitable media. These articles may be other articles used for fastening clothes, shoes or the like. There could be a Velcro element.

In yet other forms of the invention there could be other domestic article or tools which children can use in a group, and which are melded into a collective story or family. There could be different cooking utensils, eating utensils, gardening utensils, office utensils. The invention is concerned with building a persona and family around the select group and rendering and portraying that effectively to facilitate learning. The concept of the invention includes grouping together items which are normally a problem to a child, and forming them into a basis for user friendly rendering. In this sense the fastening devices form a unique group.

Many other forms of the invention exist, each different from the other and that is a detail only.

What is claimed is:

1. A method of facilitating childhood learning comprising: providing fastening devices for use on apparel articles; modifying the shape of the fastening devices to give the fastening devices an appearance of characters which are portrayed in a story; teaching a child how to manipulate the fastening devices by relating the story in a selected media wherein the shape of each fastening device is modified to give the fastening device a personalized appearance by adding features of a human being, the features comprising at least one of eyes, ears, a nose, a mouth, arms or legs.

2. A method as claimed in claim 1, wherein the fastening devices include at least one of a zipper, a snap, a button, a buckle, a string mild a lace.

3. A method as claimed in claim 2, wherein the characters include multiple characters developed using multiple zippers, multiple snaps, multiple buttons and multiple buckles and multiple strings or laces.

4. A method as claimed in claim 1 wherein the media for relating the story is at least one of a book, television or radio rendition, movie, video, cards.

5. A method as claimed in claim 1 wherein each of the characters are named with a selected name to facilitate character identification and thereby promote learning.

6. A method as claimed in claim 1, wherein the apparel articles include clothes.

7. A method comprising: providing a fastening device; modifying the shape of the fastening device to give the fastening device an appearance of a character which are portrayed in a story; and relating the story in a selected media, in order to facilitate childhood learning on how to manipulate the fastening device, wherein the fastening device is for use on apparel articles media, the shape of each fastening device modified to give the fastening device a personalized appearance by adding features of a human being, the features comprising at least one of eyes, ears, a nose, a mouth, arms or legs; such that each fastening device represents a different character in the story.

8. A method as claimed in claim 7 wherein the fastening device is chosen from the group consisting of a zipper, a snap, a button, a buckle, a string and a lace.

9. A method as claimed in claim 7, wherein the apparel articles include clothes.

10. A system comprising: a group of fastening device for use on apparel articles, the fastening devices having an appearance of characters which are portrayed as characters in a story; and a selected media for relating the story, each fastening personalized by adding features of a human being, the features comprising at least one of eyes, ears, a nose, a mouth, arms or legs, such that each fastening device represents a different character in the story;

wherein association between the fastening devices and the media facilitates childhood learning on how to manipulate the fastening devices.

11. A system as claimed in claim 10, wherein the fastening devices includes at least one of a zipper, a snap, a button, a buckle, a string and a lace.

12. A system as claimed in claim 11, wherein the characters include multiple characters developed using multiple zippers, multiple snaps, multiple buttons and multiple buckles and multiple strings or laces.

13. A system as claimed in claim 10, wherein each of the character are named with a selected name to facilitate character identification and thereby promote learning.

14. A system as claimed in claim 10, wherein the apparel articles include clothes.

15. A system comprising: fastening devices for use on apparel articles, the fastening devices having an appearance of characters; and a media, the media being selected from the group consisting of at least one of a book, television or radio rendition, movie, video, cards, the shape of each fastening device personalized by adding features of a human being, the features comprising at least one of eyes, ears, a nose, a mouth, arms or legs, such that each fastening device represents a different character which is portrayed in the media;

wherein association between the fastening devices and the media facilitates childhood learning on how to manipulate the fastening devices.

16. A system as claimed in claim 15, wherein the apparel articles include clothes.

* * * * *